United States Patent [19]

Stoltze et al.

[11] 4,115,611

[45] Sep. 19, 1978

[54] SELECTIVELY BONDED COMPOSITE TAPE

[75] Inventors: Leon Stoltze, East Hartland; John M. Graff, West Suffield, both of Conn.

[73] Assignee: United Technologies Corporation, Hartford, Conn.

[21] Appl. No.: 749,134

[22] Filed: Dec. 9, 1976

[51] Int. Cl.² .................................................. B32B 3/00
[52] U.S. Cl. ..................................... 428/174; 228/190; 264/89; 428/294
[58] Field of Search ............... 428/161, 162, 164, 166, 428/294, 226, 902, 114, 167, 172, 113, 573, 594, 606, 607, 614, 941, 174, 178, 182; 228/190; 156/176, 166; 264/56, 57, 58, 89, 93

[56] References Cited

U.S. PATENT DOCUMENTS

| 3,406,446 | 10/1968 | Muldovan | 228/190 |
| 3,419,952 | 1/1969 | Carlson | 228/190 |
| 3,609,855 | 10/1971 | Schmidt | 228/190 |
| 3,936,550 | 2/1976 | Carlson et al. | 428/294 |
| 3,984,043 | 10/1976 | Kreider et al. | 228/190 |

Primary Examiner—Marion E. McCamish
Attorney, Agent, or Firm—Charles A. Warren

[57] ABSTRACT

A partially compacted fiber-reinforced metallic tape has a layer of collimated fibers between two layers of metal foil, the foil being partially compacted around the fibers, somewhat deforming the foil around the fibers and, in selected areas only, the foil being fully compacted around the fibers forming complete bonds between the metal foil layers and the fibers in these areas.

7 Claims, 2 Drawing Figures

SELECTIVELY BONDED COMPOSITE TAPE

BACKGROUND OF THE INVENTION

In making composite structures by building up a stack of tapes, each tape is comprised of a layer of collimated fibers held against a metallic foil backing for holding the fibers in position during stacking. The fibers are held against the foil backing in several ways, such as by a plasma metal spray that forms a coating to hold the fibers in position. These tapes are limited in practical length, costly, and the fiber properties may be adversely affected by the matrix when applied by plasma-spraying.

Tapes have been made with organic binders holding the fibers in position and the tape consists of two metal sheets with the binder and fibers sandwiched in between. If the binder is volatile, the final bonding of the composite cannot be done until the volatile binder is all disposed of and thus the process requires much time as well as the necessary vacuum chambers and associated pumps. Further, the fibers may become misaligned between the vaporization of the binder and the application of full densification pressure.

SUMMARY OF THE INVENTION

One feature of this invention is a tape that requires no temporary binder of any type. Another feature is the full compaction of the tape in selected areas only during manufacture of the tape to hold the foils in position on opposite sides of the layer of fibers. Another feature is a partial compaction of the tape with full compaction only in selected areas, the size and spacing of these areas being dependent upon fiber size and spacing and the material and thickness of the foil.

According to the invention, a tape is made up of a single layer of collimated fibers positioned between metallic foil covering sheets and the tape is then fully compacted in selected spaced areas to establish a good bond between the opposing foil sheets and the fibers in these areas. This makes a unitary tape that can be handled in shaping, cutting and assembling in a stack without loss or misalignment of the fibers. In most cases the entire tape is also partially compacted between the areas of full compaction to make a thinner tape that gives better stacking characteristics and handleability.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

The tape of the invention is used in making composite structures by stacking the tapes to the desired configuration and then densifying and bonding all the tapes together under heat and pressure to form the completed structure. The tapes must be such as to retain their integrity with the fibers therein remaining in position during the necessary handling in stacking. The present invention meets this requirement.

Figure 1:
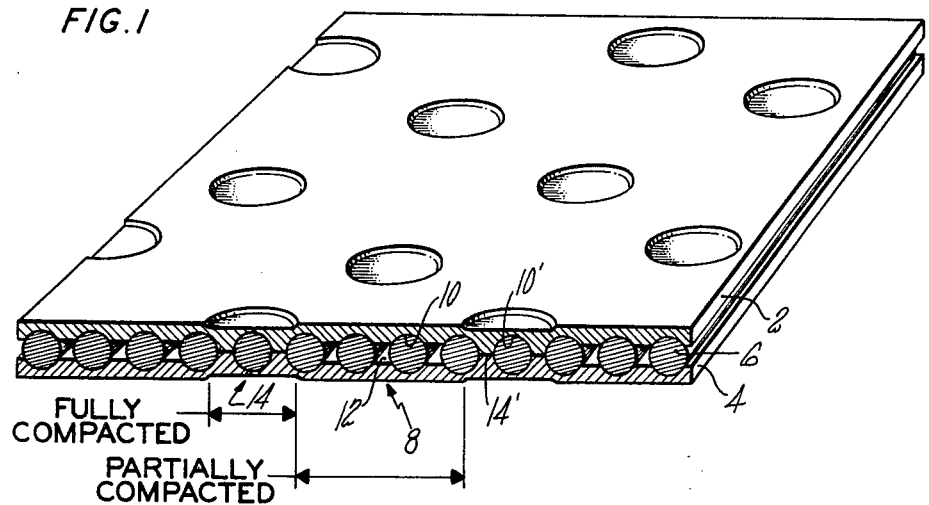
FIG. 1 is a perspective view of a tape embodying the invention.

As shown in FIG. 1, the tape is made up of facing foil sheets 2 and 4 on opposite sides of a monolayer of collimated fibers 6. The assembled fibers and covering foils are partially compacted to produce the result shown at 8, the area marked "Partial Compaction." In this partial compaction, the foil sheets are forced together to some extent and the material of the foils is extruded somewhat over each fiber to form, in each foil, grooves 10 to receive the fibers and ridges 12 between the grooves and extending between the fibers. These ridges on either of the opposed foil sheets do not extend far enough to touch the ridges on the other sheet as shown.

For securely holding the sheets and fibers in assembled relation in the tape, selected areas 14 of the tape are fully compacted, this being shown by the designation "Fully Compacted" on the drawing. These areas are not necessarily contiguous as shown and are so spaced that they will function to hold the two sheets securely enough so that the tape can be handled without affecting the integrity of the tape. In these fully compacted areas the foils are forced together enough, more than in the partially compacted area, to deepen the grooves 10' holding the fibers to complete semicircles so that the opposed grooves fully enclose the fibers. In so doing, this increases the heights of the intervening ridges 14' so that opposed ridges are in contact and are securely bonded together. This tape is now ready for use and may be cut, shaped, and stacked without loss of the parallel relation and spacing of the fibers in the tape.

This tape is a complete structure without the need for plasma spray or organic resins for holding the elements of the tape together and there is no foreign matter that must be removed as by volatilization in making the composite structure.

As described, the tape is first partially compacted over its entire area and then fully compacted in selected areas. However, it is conceivable that suitable devices could perform the partial and full compaction in a single step. The important feature is the full compaction in selected areas only. A tape of this type is advantageous for several reasons. There is no binder so the binder cost, and the time and expense of application and subsequent necessary removal of the binder is avoided. The tape, partially compacted is thinner and therefore has reduced stiffness and has improved lay-up ability as well as reduced accumulated thickness in the stack. The partially bonded areas permit matrix deformation during final densification and bonding to break up any oxides or other undesirable materials on the tape surfaces, thereby to provide a virgin matrix bond between the foils, between the foils and the fibers, and between adjacent tapes. This process is applicable to continuous tape fabrication so that the dimension of the tape is not limited as before.

The tape as shown in FIG. 1 was made with boron fibers 0.0056 inch in diameter and the foils were 0.0015 inch thick aluminum. For compaction a pressure of 5000 psi was used for full compaction and of less than 2500 psi for the partial compaction. The pressure is applied for less than two minutes and at a temperature of 900° F.

Tapes of this type may be made by the well-known step-by-step pressing of a long strip of tape. This is produced by feeding a number of filaments through a collimator and thence between sheets of foil into a press where the compaction occurs between molds in a step-by-step process. Pull rolls that mantain the tape under tension draw the completed tape from the press and thus maintain a tension on the fibers to keep the desired spacing and parallelism of the fibers.

In the production of large sized sheets, it is expected that the fibers would be wound under tension on a foil clad mandrel after which a covering foil is applied and the partial and complete compaction carried out on the mandrel before removing the assembled foil and fibers from the mandrel. Both the flat assembly of foil and fibers prior to compaction and the winding of the fibers on a foil covered mandrel are well-known and are used in the art as described in U.S. Pat. No. 3,606,667 in aligning the fibers in readiness for a plasma spray or other coating for holding the fibers in parallel relation on a backing sheet. No claim is made to these techniques. The novelty in the present invention is the complete compaction of the assembled foil and fibers in selected noncontiguous areas and the partial compaction in the remaining areas. The technique for such partial and complete compaction when the foil sheets are applied and while the fibers are still held in parallel relation will be obvious to one skilled in this art once the concept of such partial and total compaction is known.

Although this has been described as applicable to a monolayer tape it will be apparent that it is also applicable to a multilayer tape where the several layers of foil would be fully compacted only in selected areas. The same benefits would be obtained as in the monolayer tape.

Figure 2:
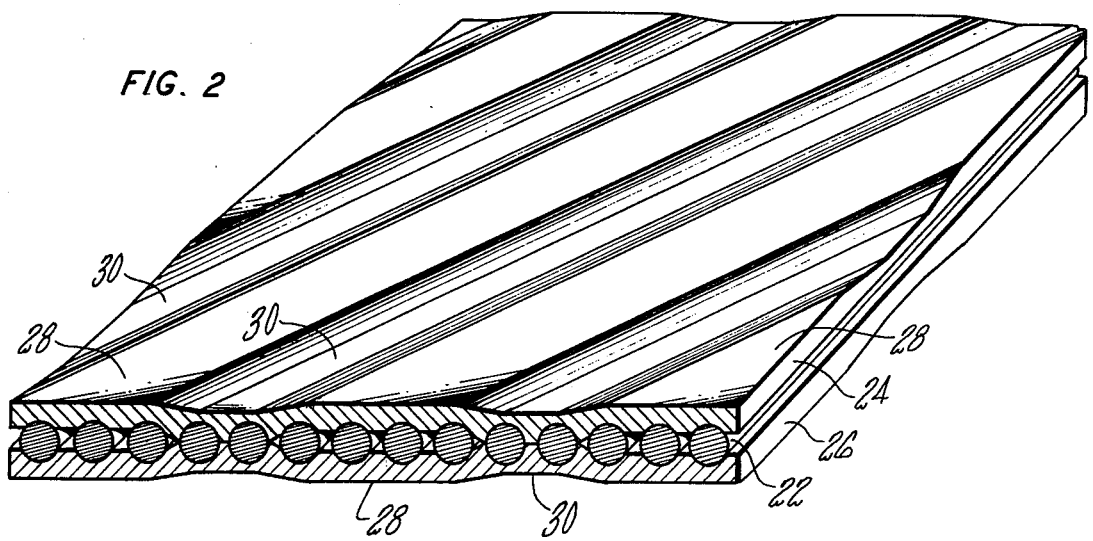
FIG. 2 is a perspective view of a modification.

A modified form of tape is shown in FIG. 2 in which the layer of collimated fibers 22 are positioned between foil sheets 24 and 26. The assembly is partially compacted in the areas 28 and fully compacted in the areas 30. In this arrangement, the fully compacted areas, instead of being discrete spots, are parallel strips preferably at an angle to the fibers so that all of the fibers, in selected portions only, are necessarily within the full compaction areas. The same results are obtained as in the structure of FIG. 1. In this modification the fibers shown are Borsic TM fibers 0.0057 inch in diameter and the foils are titanium alloy (6A1-4V) 0.002 inch thick. For compaction, the full compaction is done under 15,000 psi and the partial compaction under 7500 psi for two minutes at 1600° F. When the tape is completely formed, as shown, the thickness in the fully compacted area is 0.007 inch and in the partially compacted areas is 0.0085 inch. It will be apparent that the areas of partial and complete compaction blend gradually with one another as shown. Obviously, other fibers and foils may be used in practicing the invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A composite tape consisting of:
    a layer of collimated fibers; and
    a foil sheet on each side of the fibers and in direct contact therewith, the assemblage being compacted fully only in certain non-contiguous areas to cause deformation of the sheets around the fibers and contact between and bonding of the opposed sheets between adjacent fibers in these selected areas only with this bonding holding the tape together in assembled form, the remainder of the assemblage having less compaction with the contiguous surfaces of the sheets out of contact in these areas.

2. A tape as in claim 1 in which the assemblage is only partially compacted over the remaining area with the opposed sheets out of contact in this remaining area.

3. A tape as in claim 1 in which the full compaction is in spaced parallel strips at an angle to the fibers.

4. A tape consisting of:
    a layer of collimated fibers; and
    a foil sheet on each side of and in direct contact with the fibers;
    the sheets in certain non-contiguous areas of the tape only being shaped to have deep grooves to receive the fibers therein and with intervening ridges between the fibers, these ridges on opposite sheets in these certain areas being bonded together to make a unitary tape, the remaining areas having shallower grooves for the fibers with the surfaces of the opposed sheets in these areas out of contact.

5. A tape as in claim 4 in which, over the remainder of the tape, the opposed sheets have shallower grooves receiving the fibers with and ridges between the fibers, these ridges on opposed sheets being spaced from each other.

6. In the manufacture of composite tape, the steps of:
    collimating a single layer of fibers;
    placing a foil sheet on opposite sides of the layer of fibers and in direct contact therewith;
    compacting in certain non-contiguous areas only the assemblage of fibers and foil sheets, to deform the sheets around the fibers, to contact the opposed foil sheets between the fibers and to bond the sheets together between the fibers in these areas only, the opposed foil sheets being out of contact in the remaining areas.

7. The method of claim 6 including the added step of partially compacting the remainder of the assemblage to deform the sheets partially around the fibers but not to cause contact of the sheets between the fibers.

* * * * *